(12) United States Patent
Hua et al.

(10) Patent No.: US 12,541,435 B2
(45) Date of Patent: Feb. 3, 2026

(54) RAPID ACCESS FOR RESTORED CLOUD BACKUP DATA

(71) Applicant: Commvault Systems, Inc., Tinton Falls, NJ (US)

(72) Inventors: Xia Hua, Mountain View, CA (US); Woonho Joseph Jung, Cupertino, CA (US); Jinmyeong Kim, Seongnam (KR); Junhwan Kim, Seoul (KR); Seunghyeon Kim, Seoul (KR); Yuchon Yi, Yongin-si (KR); Nicholas Gerald Zehender, San Jose, CA (US); Jason Sarich, Morgan Hill, CA (US); Jaewon Wi, Seoul (KR)

(73) Assignee: Commvault Systems, Inc., Tinton Falls, NJ (US)

( * ) Notice: Subject to any disclaimer, the term of this patent is extended or adjusted under 35 U.S.C. 154(b) by 12 days.

(21) Appl. No.: 18/505,868

(22) Filed: Nov. 9, 2023

(65) Prior Publication Data

US 2025/0156277 A1    May 15, 2025

(51) Int. Cl.
*G06F 11/14* (2006.01)
(52) U.S. Cl.
CPC ...... *G06F 11/1451* (2013.01); *G06F 11/1435* (2013.01); *G06F 11/1464* (2013.01); *G06F 11/1469* (2013.01)
(58) Field of Classification Search
CPC ............. G06F 11/1469; G06F 11/1464; G06F 11/1435; G06F 11/1451
See application file for complete search history.

(56) References Cited

U.S. PATENT DOCUMENTS 8,799,223 B1 * 8/2014 Karmarkar .......... G06F 11/1451
                                                                       707/646
10,635,545 B1    4/2020 Bono et al.
(Continued)

FOREIGN PATENT DOCUMENTS

CN         115658382 A       1/2023

OTHER PUBLICATIONS

Office Action in U.S. Appl. No. 17/929,591 mailed Jan. 29, 2024, 30 pages.
(Continued)

*Primary Examiner* — Kamini B Patel
(74) *Attorney, Agent, or Firm* — Commvault Systems, Inc.

(57) ABSTRACT

Techniques are disclosed relating to providing fast access to restored data in a cloud storage environment. A computing system stores multiple sets of incremental backup data that reflect changes in data being backed up between backup intervals and metadata that indicates which set of incremental backup data stores a given object. The computing system generates an endpoint for a requesting computing system, where the endpoint supports requests for restored backup data and data responses. In response to a request from the requesting computing system via the endpoint, the computing system queries the metadata based on the request and stores metadata retrieved from the query in a key/value store using object identification information as key data and the retrieved metadata as value data. The computing system provides requested data according to a lazy loading technique, including providing requested data via the endpoint based on the metadata in the key/value store.

16 Claims, 7 Drawing Sheets

(56) References Cited

U.S. PATENT DOCUMENTS

| | | | |
|---|---|---|---|
| 10,725,967 | B1 | 7/2020 | Natanzon |
| 10,896,097 | B1* | 1/2021 | Purcell ................ G06F 11/1451 |
| 12,111,734 | B2 | 10/2024 | Agarwal |
| 2011/0252192 | A1 | 10/2011 | Busch et al. |
| 2013/0179947 | A1* | 7/2013 | Kline, III ............ H04L 63/0892 726/4 |
| 2014/0089279 | A1* | 3/2014 | Gibson ............... G06F 11/1451 707/731 |
| 2014/0181438 | A1 | 6/2014 | Varadharajan et al. |
| 2014/0310247 | A1 | 10/2014 | Vijayan et al. |
| 2016/0203145 | A1 | 7/2016 | Haviv et al. |
| 2017/0010941 | A1 | 1/2017 | Shimada et al. |
| 2019/0278663 | A1 | 9/2019 | Mehta et al. |
| 2020/0241967 | A1* | 7/2020 | Dain .................. G06F 11/0793 |
| 2020/0311039 | A1 | 10/2020 | Gupta et al. |
| 2021/0096958 | A1 | 4/2021 | Kumar et al. |
| 2021/0406129 | A1 | 12/2021 | Zheng et al. |
| 2022/0229733 | A1 | 7/2022 | Chitloor et al. |
| 2022/0229735 | A1 | 7/2022 | Chopra et al. |
| 2022/0263657 | A1 | 8/2022 | Chang |
| 2022/0283707 | A1 | 9/2022 | Ayzenberg et al. |
| 2023/0019837 | A1* | 1/2023 | Jennings .................. G06F 40/20 |
| 2023/0315582 | A1 | 10/2023 | Anand |
| 2024/0022446 | A1* | 1/2024 | Vaughn ................ H04L 12/1822 |
| 2024/0152491 | A1* | 5/2024 | Malik .................. G06F 16/2282 |

OTHER PUBLICATIONS

Notice of Allowance in U.S. Appl. No. 17/929,591 mailed Aug. 7, 2024, 8 pages.

Gilani, How to Search an S3 Bucket, a Complete Guide, Shade, posted Oct. 29, 2023; https://www.shade.inc/tools/how-to-search-an-s3-bucket (Year: 2023); 10 pages.

Amazon Simple Storage Service—User Guide: API Version Mar. 1, 2006; copyright 2022; 1565 pages.

IBM i 7.3: Systems management Backup, Recovery, and Media Services for i; Copyright International Business Machines Corporation 1998, 2015; 492 pages.

Oracle, Database Backup and Recover Basics, 4.4-4.4.4.4, 2022, 10 pages.

IBM, Incremental backups; https://www.ibm.com/docs/en/psfa/7.2.1?topic=command-incremental-backups; last Updated: Apr. 26, 2022, copyright IBM Corporation 2015, 2016; 1 page.

Office Action in U.S. Appl. No. 17/929,593 mailed May 28, 2024, 23 pages.

\* cited by examiner

FIG. 1

Key/value store 140

| Key | Value |
|---|---|
| Prefix/Object Name 212A | Metadata Value 222A |
| Prefix/Object Name 212B | Metadata Value 222B |
| ... | ... |
| Prefix/Object Name 212N | Metadata Value 222N |

RAPID ACCESS FOR RESTORED CLOUD BACKUP DATA

BACKGROUND

Technical Field

This disclosure relates generally to data backups and more particularly to fast access to restored data in a cloud storage environment.

Description of Related Art

Backup and archiving of data in computing systems is important in various contexts, e.g., to mitigate or prevent data loss due to equipment failure or malicious activity. Many data stores are now cloud based, e.g., Amazon Web Services S3 storage, Microsoft Azure, IBM cloud databases, etc. Cloud-based systems may allow entities to store substantial amounts of data without maintaining the storage hardware. Providing backups in the cloud-based context may be challenging in terms of security, ransomware protection, compute resources, cost, etc.

Some data stores are structured while others are unstructured, each of which may have various advantages and drawbacks. A key-value database is one type of a non-relational database that stores data as a collection of key-value pairs, where a key is used as a unique identifier to retrieve associated value with each key. The keys and values may be, for example: strings, numbers, complex objects, etc. Amazon simple storage service (S3), for example, is a cloud-based key-value data store, for storing diverse and mostly unstructured data. S3 buckets are containers that store uploaded objects.

Backup storage services are typically utilized to protect various types of information from being lost due to hardware failure, file corruption, malicious entities, natural disasters, etc. It may be desirable to backup cloud-based data and potentially to use cloud-based solutions for the backup storage. Generally, backups may be challenging in terms of differentiating between types of data, time-constraints, data size and cost, querying backups, restoration, etc. In addition, cloud-based backup services may face challenges of object versioning overhead, costs for small files, etc.

Further, restoration of data for a given backup to a client account may take a substantial amount of time, particularly for large backups in the incremental backup context.

DETAILED DESCRIPTION

U.S. patent application Ser. No. 17/929,591 titled "Protection Groups for Backing up Cloud-Based Key-Value Stores," and filed Sep. 2, 2022 is incorporated by reference herein in its entirety. The '591 application discusses various techniques for granular key/value-based cloud storage backups. It also discusses various structures for organizing and retrieving backup data, e.g., using protection groups.

Generally, a backup system may store data very differently than an application that uses the data. In particular, a backup may be organized for retention, storage size, etc. and may use metadata may specify the organization (e.g., using pointers to indicate where a given object is stored in an incremental backup). In this context, it may be challenging to access restore data quickly. Customers may want granular point-in-time recovery, however, while desiring rapid access to certain restore data. For example, some customers may run tests or validations of their backups periodically.

In the context of the '591 application, for example, a restore operation may involve querying a metadata engine to obtain a list of objects and using worker functions (e.g., Amazon S3 lambda functions) to return the data to customer data buckets. This full restore may take substantial time, however.

Therefore, in disclosed embodiments, a system performs a metadata query and then inserts the metadata in a key/value store such as a DynamoDB table (e.g., with the key being an object identifier and the value being the corresponding metadata). The system may use lazy loading to access requested objects based on corresponding metadata in the key/value store. The system may also generate a virtual endpoint to allow the user application to query the key/value store and respond with corresponding object data. This quick access may be provided in parallel with a full restore to the customer's data buckets.

Disclosed techniques may advantageously allow fast, granular access to portions of a backup in parallel with a slower full restoration of the backup.

Further, in some embodiments, the system may execute multiple queries to multiple partitions of backup metadata and store the metadata by mapping multiple partitions to the key/value store. The metadata within a key/value store may be sorted based on an ordering among the partitions and an ordered list of metadata within the partitions. This may further advantageously improve query performance, in various embodiments.

Overview of Fast Restore Functionality for Incremental Backup System

Figure 1:
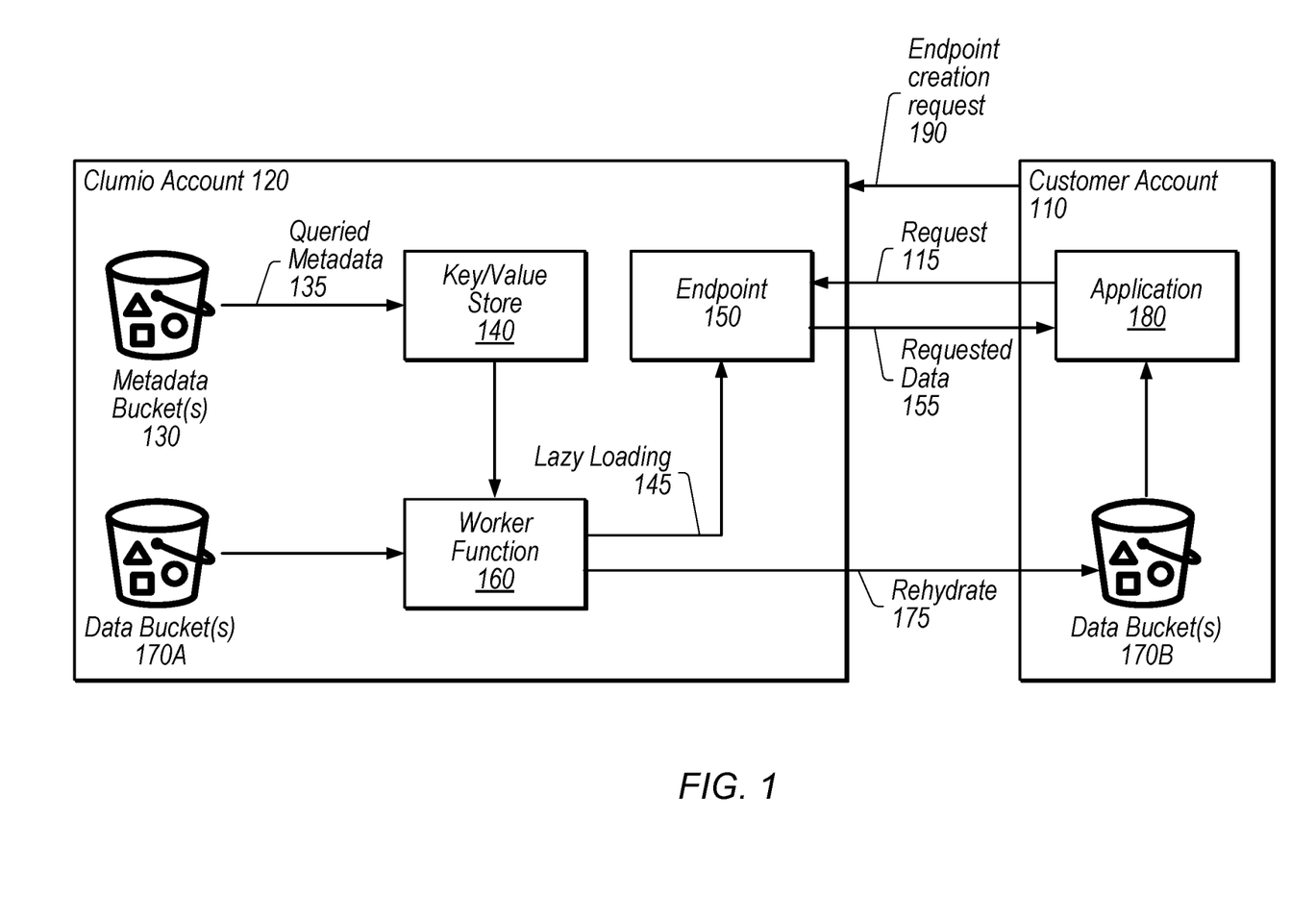
FIG. 1 is a block diagram illustrating an example backup service that allows an application to access backup data via an endpoint, according to some embodiments.

Turning now to FIG. 1, a block diagram of a system is shown. The illustrated system includes a set of components that may be implemented via hardware or a combination of hardware and software. In the illustrated embodiment, system 100 implements customer account 110 and Clumio account 120. Clumio account 120 includes metadata bucket(s) 130, key/value store 140, endpoint 150, worker function 160, and data bucket(s) 170A. In the illustrated embodiment, customer account 110 includes application 180 and data bucket(s) 170B.

The illustrated system, in various embodiments, implements a quick access service that allows customer account 110 to access backup data stored within its corresponding Clumio account 120 via an endpoint 150. Customer account 110 is an account of a cloud-based storage service (e.g., a cloud key-value store), such as Amazon S3, that allows users of that service to develop, run, and manage applications 180. For example, application 180 may execute in a virtual environment hosted on server-based hardware included in a datacenter of a cloud provider. Accordingly, application 180 may store and retrieve data objects within an object store, such as data bucket(s) 170A, during its execution.

As shown, customer account 110 communicates with a backup service account (Clumio account 120) that is configured to restore backup data from data bucket(s) 170A into corresponding data bucket(s) 170B in certain scenarios (shown as a "rehydrate" operation in FIG. 1). Clumio account 120 may be an account on the same cloud-based storage service as customer account 110, a different cloud-based storage service, or a non-cloud-based storage system. In some embodiments, data bucket(s) 170A store a backup of the data objects in data bucket(s) 170B that are associated with one or more customer accounts 110. Note that the organization of data bucket(s) 170A and 170B may be substantially different, as discussed above, e.g., bucket(s) 170B may be optimized for performance for application 180 while buckets 170A may be optimized for storage goals. Further, data bucket(s) 170A may store backups incrementally (e.g., where a given backup stores changes that occurred since the last backup).

As part of the backup operation, metadata corresponding to its respective object stored in data bucket(s) 170A is stored in metadata bucket(s) 130. In some embodiments, any number of items of metadata may be included in metadata bucket(s) 130, including but not limited to a container ID, backup time, backup ID, source bucket, source key, source version, target bucket, target key, header offset, data offset, last modified time, size, Etag, storage class, tags, is latest, is deleted, is delete marker, backup tier, stack ID, etc. Metadata is discussed in greater detail below with respect to FIG. 2.

Note that metadata may or may not be stored in buckets. In some embodiments, metadata is stored in a structured data store, e.g., a data lake. This may facilitate queries to the metadata in various scenarios.

Account 120 may restore backup data in various scenarios, such as a user-initiated request or in response to application 180 losing access to data in data bucket 170B (e.g., data corruption, hardware or software failure, etc.). In some scenarios, Clumio account 120 generates endpoint 150 which allows customer account 110 to quickly access backup data stored within its respective data bucket 170A. In some embodiments, account 120 creates endpoint 150 in response to an explicit request from account 110, e.g., as discussed below with reference to FIG. 4. In the illustrated embodiment, request 190 is an endpoint creation request. In response to the request, worker function 160 (e.g., an AWS lambda function) or another worker function may retrieve one or more metadata values from metadata bucket(s) 130 and populate the key/value store 140. Key/value store 140 may be one or more tables (e.g., DynamoDB tables) that include a key value and a metadata value associated with a given data object stored in data bucket(s) 170A. Key/value store 140 is discussed in greater detail with respect to FIG. 2. The request may specify an entire backup or a portion thereof (e.g., a protection group or a portion of a protection group).

When application 180 sends a request 115 to access data from endpoint 150, worker function 160 retrieves the requested data object from data bucket(s) 170 based on the object identification information in key/value store 140. For example, application 180 may send a request to access a particular data object from a specified point in time. Worker function 160 uses the object identifier as a key to access key/value store 140 and retrieve the corresponding metadata. Worker function then uses the metadata from key/value store 140 to identify and retrieve the requested object data from data bucket(s) 170A. As shown, worker function 160 may perform lazy loading operation(s) 145 in which it loads only the data objects requested by application 180. For example, application 180 may need to access a particular object, such as a photo, from endpoint 150, and as a result, worker function only retrieves and lazy loads 145 the particular object to endpoint 150.

As shown, the rehydration of data bucket(s) 170B may occur in parallel with the fast access via endpoint 150 in certain situations. Endpoint 150 may often provide access to objects via lazy loading substantially faster than waiting for the requested objects to be rehydrated, however.

Figure 2:
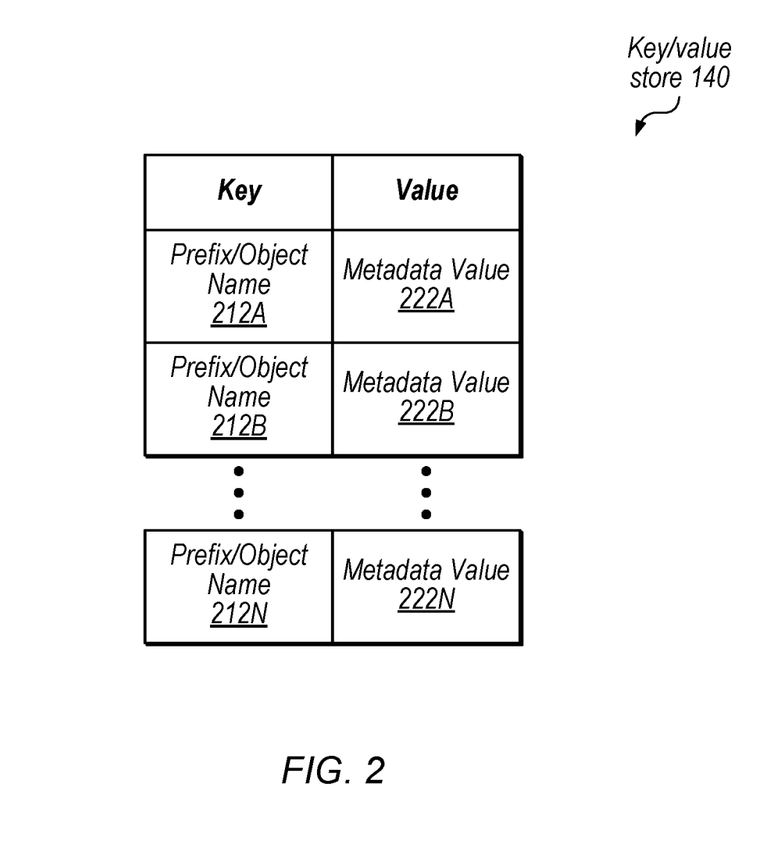
FIG. 2 is a block diagram illustrating an example key/value store, according to some embodiments.

Turning now to FIG. 2, a block diagram of key/value store 140 is shown. In the illustrated embodiment, key/value store includes keys 212A-212N and corresponding values 222A-222N. As shown, the keys may include prefixes, object names, or both, although other object identification encodings may be used in other implementations.

Key/value store 140, in various embodiments, is a lookup table (e.g., DynamoDB) that stores key-value pairs and is accessible by worker function 160. In some embodiments, a given key is a unique identification associated with a data object stored in data bucket(s) 170A. For example, an object name 212 may be a string of characters specified by a user, such as "object_name_x", when the object was created.

A given metadata value 222 describes a data object stored in data bucket(s) 170A, such as metadata value 222, and is associated with a specific key 212. Metadata value 222, in various embodiments, is used by worker function 160 to identify the location of a particular object in data bucket(s) 170A. Metadata value 222 may include data such as a container ID, backup time, backup ID, source bucket, source key, source version, target bucket, target key, header offset, data offset, last modified time, size, Etag, storage class, tags, is latest, is deleted, is delete marker, backup tier, stack ID, etc. These example types of metadata are briefly discussed below. In some embodiments, a subset of fields of the metadata are sufficient to identify the location of an object or set of objects for retrieval. For example, the target bucket, target key, header offset, and data offset may provide a pointer to a given object in data bucket(s) 170A.

In various embodiments, storing metadata for a set of objects in key/value store 140 may allow substantially faster access to those objects, e.g., relative to querying metadata store 130 as requests are received. (Particularly where endpoint 150 is created for a subset of an overall backup, such as a protection group or a specific prefix).

In some embodiments, container ID metadata indicates a particular protection group a data object is associated with. In some embodiments, backup time metadata provides the time (e.g., epoch) of backup for a particular object stored in data bucket(s) 170B. In some embodiments, backup ID metadata indicates the particular backup in which a data object was stored.

In some embodiments, source bucket metadata identifies the Amazon S3 bucket a data object is associated with (e.g., in account 110). In some embodiments, source key metadata identifies a unique key associated with an object. In some embodiments, a particular object has a unique key, but may have multiple different versions. In some embodiments, source version metadata indicates a version number for an object.

In some embodiments, target bucket metadata indicates the backup bucket associated with an object (e.g., in account 120). In some embodiments, target key metadata indicates the backup key associated with an object.

In some embodiments, header offset metadata refers to the offset within a packed object where metadata associated with the object is stored (where a packed object may include multiple backed-up objects). In some embodiments, data offset metadata refers to the offset within a packed target object where the data for the object is stored.

In some embodiments, last modified time metadata provides the time (e.g., epoch) of when an object was last modified. In some embodiments, the last modified time for an object may be larger or smaller than the backup time associated with the object. In some embodiments, size metadata provides the size of an object. In some embodiments, Etag metadata reflects changes to the contents of an object.

In some embodiments, storage class metadata provides the storage class (e.g., S3 standard, S3 one Zone-IA, S3 standard-IA, etc.) associated with an object before backup. In some embodiments, tags metadata provides the custom tags specified for objects. In some embodiments, backup tier metadata indicates a backup tier (e.g., cold, warm, frozen, etc.) associated with an object, where the backup tier indicates a level of redundancy, cost, and accessibility (e.g., access time), for example.

In some embodiments, is latest metadata indicates whether an object is the latest version of the object. In some embodiments, is latest metadata is provided in a binary format (e.g., indicated by 1 or 0) or similar (e.g., True, False, etc.). In some embodiments, is deleted metadata indicates when an object has been deleted. In some embodiments, is deleted metadata is provided in a binary format (e.g., indicated by 1 or 0) or similar (e.g., True, False, etc.). In some embodiments, is delete marker metadata indicates whether a particular versioned object was named in a delete request. For example, the object may not be deleted, but when the is delete marker is asserted Amazon S3 may behave as if the object is deleted.

In some embodiments, stack ID metadata indicates a stack associated with an object, e.g., which may be rebuilt for restoration using parallel data chunking. In some embodiments, metadata bucket(s) 130 includes metadata of both live objects and expired objects. In some embodiments, the structure of metadata of live objects may be different from the structure of metadata of expired objects, and the metadata of live objects may be stored in a separate partition (e.g., a separate table) of metadata bucket(s) 130 than the metadata of expired objects. Note that various disclosed metadata may be stored in a structured database and may be queried based on values of various disclosed metadata fields.

Example Partitioning and Parallel Query Techniques

Note that the performance of fast restore may be affected by both the speed of the metadata query to retrieve the data for key/value store 140 and the speed at which the key/value store 140 is populated. In some embodiments, multiple key/value stores may be implemented to allow parallel provisioning, metadata may be partitioned to allow parallel queries, or both. These techniques may further advantageously improve performance of endpoint 150.

Figure 3:
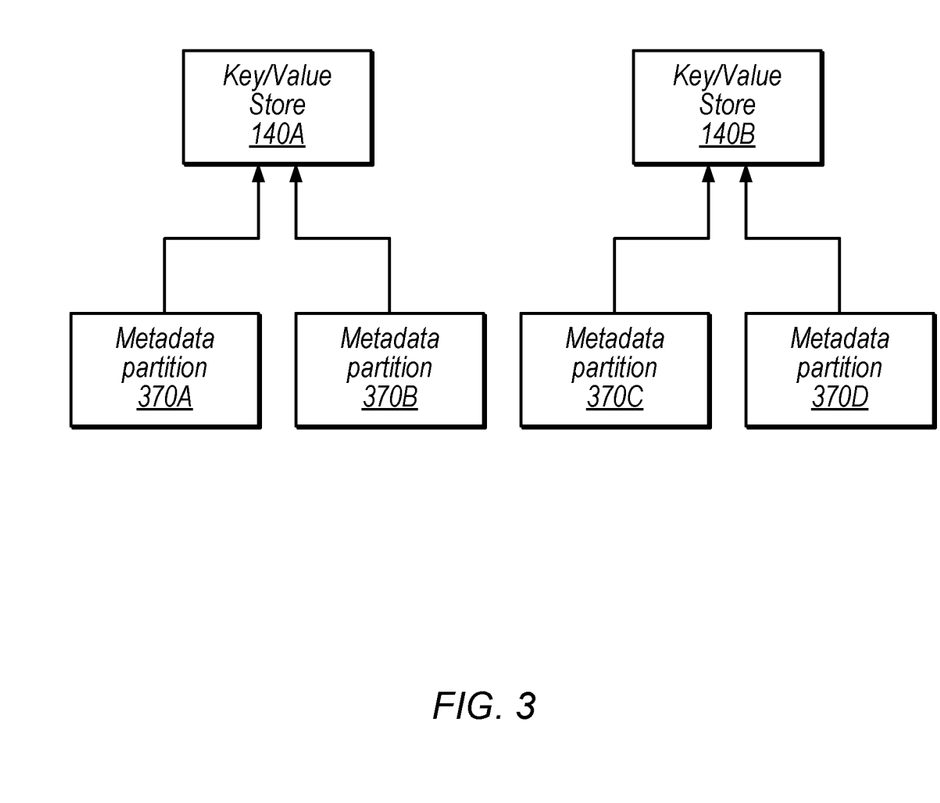
FIG. 3 is a block diagram illustrating an example of relationships between multiple key/value lookup tables and multiple metadata partitions, according to some embodiments.

Turning now to FIG. 3, a block diagram illustrating example relationships between multiple key/value lookup tables 140 and multiple metadata partitions 370 is shown. In the illustrated embodiment, metadata (which may or may not be stored in buckets) is stored in multiple partitions 370A-370D which are mapped to multiple key/value stores 140A and 140B. Note that while four partitions are mapped to two key/value stores in the illustrated example, various number of partitions and key/value stores are contemplated, potentially with different numbers of partitions mapped to a given key/value store. The illustrated example is included for purposes of explanation but is not intended to limit the scope of the present disclosure.

As discussed above, backup metadata may be stored in a data lake, for example. In the illustrated example, metadata is stored across multiple partitions 370 and a worker function may query multiple partitions 370 at least partially in parallel in response to endpoint creation request 190. This may allow the overall query to complete faster, relative to accessing the same set of metadata in a single partition, for example. As part of backing up a set of data objects, the metadata values for each object may be divided and stored into partitions, e.g., based on partition keys. For example, metadata assigned to the same partition key, such as "application sub-module," are stored within the same partition 370. Each partition 370 may contain a list of the metadata within its respective partition 370, and the list, in various embodiments, may be sorted based on a "sort" key. For example, the metadata within partition 370A may be sorted based on a sort key, such as a timestamp. Note that the system may also maintain a sorted list of partitions, which may provide an overall ordering of the metadata in conjunction with the per-partition lists.

In response to receiving request 190, worker function 160 creates an M number of key/value stores to store the requested metadata. In the illustrated example, worker function 160 has created two key/value stores 140A and 140B to store metadata from metadata bucket 130A. In order to discover the list of objects to be restored, worker function 160 executes a query to metadata bucket(s) 130 based on the query parameters provided from request 190. Worker function 160, in various embodiments, executes 'N' queries to scan 'N' partitions 370. For example, worker function 160 may execute four concurrent queries to scan four partitions 370 based on a specified protection group. The 'N' partitions may be located within one or more metadata buckets 130. Worker function 160, in various embodiments, maps an 'N/M' number of partitions to a single key/value store 140. For example, worker function 160 may create two key/value stores 140 to populate the metadata values stored within six partitions. Accordingly, worker function 160 maps three partitions 370 to one key/value store 140. As shown, worker function 160 mapped partitions 370A and B and partitions 370C and D to key/value store 140A and 140B, respectively. In other embodiments, worker function 160 may map partitions 370 based on their respective partition keys. For example, worker function 160 may map partitions 370 based on the values of the partition keys determined during the backup process in order to maintain a particular ordering.

After mapping partitions 370 to key/value stores 140, worker function 160 concurrently imports the query results into key/value stores 140. The metadata values in key/value store 140 may be further sorted based on the sort keys. For example, the metadata may retain the ordering of values from their respective partitions 370 when populated in the key/value store 140. The system may also maintain a list of key/value stores 140 to retain overall ordering. After the list of objects is populated into the key/value store 140, it may be used to streamline accesses to data requested via endpoint 150.

As discussed above, when application 180 makes a request to endpoint 150, worker function 160 retrieves the requested data 155, based on the lookup keys and corresponding values in key/value store 140, and lazy loads the requested data via endpoint 150. Lazy loading defers the loading of data objects until requested by application 180, which may advantageously allow application 180 to access a read-only version of data until the objects in data bucket(s) 170B are restored. In this manner, application 180 may operate based on backup data via endpoint 150 similar to operating based on production data from data bucket(s) 170B.

Example Endpoint Request

Figure 4:
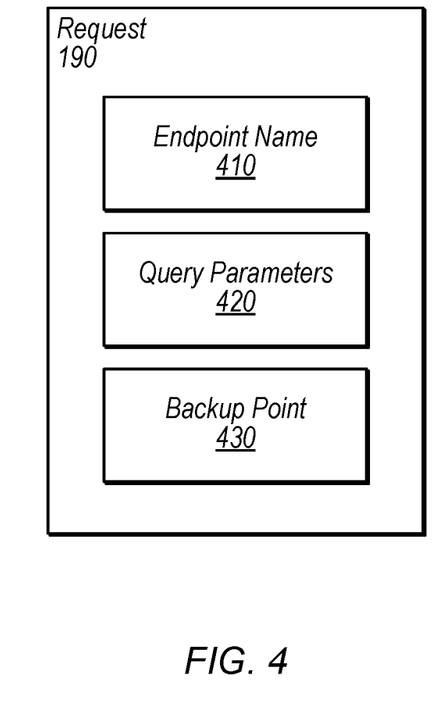
FIG. 4 is a block diagram illustrating an example request, according to some embodiments.

Various appropriate formats may be used to request an endpoint for fast, read-only access to certain restored backup data. FIG. 4 shows example fields of a request 190, according to some embodiments. In the illustrated embodiment, request 190 includes endpoint name 410, query parameters 420, and backup point 430. In some embodiments, request 190 is implemented differently than shown. As an example, request 190 may include a full restore request in which worker function 160 initiates a full restoration of the backup to data bucket(s) 170B.

Request 190, in various embodiments, may be an instruction or a set of instructions that cause worker function 160 to create endpoint 150 and key/value store 140. Endpoint 150 enables application 180 to request and access a read-only copy of data objects stored in data bucket(s) 170A. In the illustrated example request 190 includes endpoint name 410, e.g., to allow application 180 to properly access the endpoint once create. Endpoint name 410 may be a unique identification for the endpoint 150. For example, endpoint name 410 may include a string of characters. In some embodiments, request 190 may cause worker function 160 to create multiple endpoints 150 and field 410 may include multiple endpoint names.

Query parameters 420 are parameters that specify the data objects to be available via the endpoint 150. For example, query parameters 420 may specify a particular protection group. By specifying a particular protection group, worker function 160 may provide fast read-only access to the desired data within a protection group from one or more backups. A protection group may correspond to a single bucket, multiple buckets, single objects, multiple objects, objects and buckets that match specific search criteria, etc. As other examples, the query parameters 420 may indicate prefixes, individual objects, object attributes, etc.

Backup point 430 allows a customer to restore data objects from a particular backup point (e.g., a date or date and time) via endpoint 150. For example, a customer may request a particular source version based on the backup point in time. In some embodiments, a user may specify a plurality of backup points in time for various data objects. For example, a user may request a first data object from a particular backup point 430 and a second data object from a different backup point 430. As another example, a user may request all existing versions of backup objects across multiple different backups. In various embodiments, worker function 160 may query the metadata bucket(s) 130 based on query parameters 420 and backup point 430 and specify keys to populate a given key/value store 140 (along with the metadata provided by the query).

Example Methods

Figure 5:
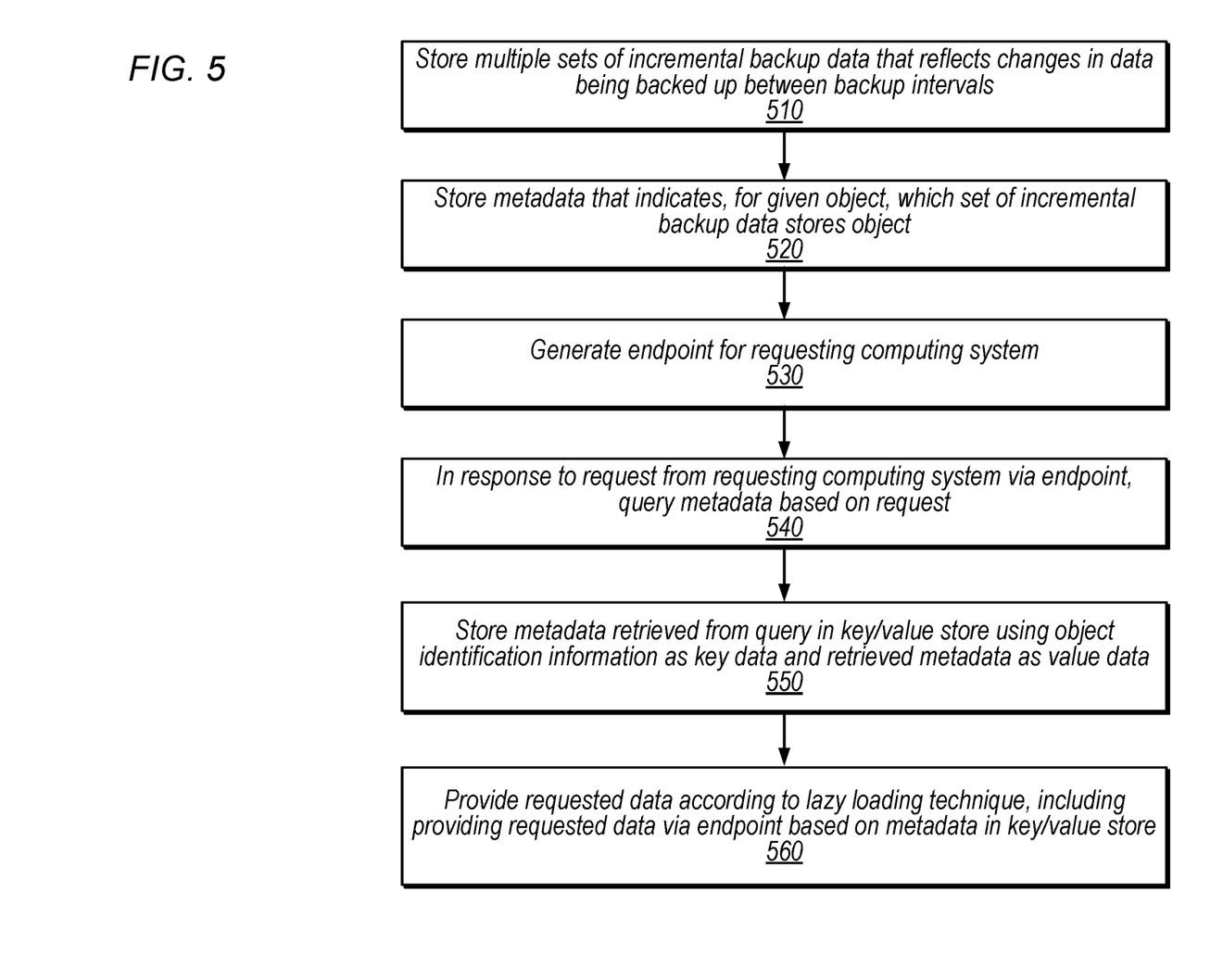
FIG. 5 is a flow diagram illustrating an example method for providing access to backup data by a computer system, according to some embodiments.

FIG. 5 is a flow diagram illustrating an example method for implementing a quick access service that allows a computing system to provide access to backup data to a requesting computing system, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510 a computing system stores multiple sets of incremental backup data (e.g., data bucket(s) 170A) that reflects changes in data being backed up between backup intervals. At 520, the computing system stores metadata (e.g., metadata bucket(s) 130) that indicates, for a given object, which set of incremental backup data stores the object. In some embodiments, the metadata includes object location information, an object creation time, and a size of the object.

At 530, the computing system generates an endpoint (e.g., endpoint 150) for a requesting computing system. In various embodiments, the endpoint supports requests (e.g., request 115) for restored backup data and data responses. In response to the request, the computing system may perform a full restore (e.g., rehydrate 175) of requested data to a data store of an account (e.g., customer account 110) associated with the request. The full restore may be performed at least partially in parallel with the lazy loading technique (e.g., lazy loading 145). In some embodiments, the request specifies at least one protection group (e.g., query parameters 420) and/or restoration time information (e.g., backup point 430). The computing system may generates the endpoint in response to an endpoint request from the requesting computing system.

At 540, the computing system queries the metadata based on the request in response to a request from the requesting computing system via the endpoint. In various embodiments, the object identification information (e.g., a prefix/object name 212) includes an object name, a prefix, or both. The computing system may perform multiple queries at least partially in parallel to multiple different partitions (e.g., partitions 370) of the multiple sets of incremental backup data. In some embodiments, the computing system queries the metadata based on a mapping of multiple partitions to a given lookup table of the multiple different lookup tables.

At 550, the computing system stores metadata retrieved from the query (e.g., queried metadata 135) in a key/value store (e.g., key/value store 140) using object identification information as key data and the retrieved metadata as value data. In some embodiments, the computing system stores retrieved metadata in multiple different lookup tables of the key/value store. In some embodiments, the computing system stores the metadata based on a mapping of multiple partitions to a given lookup table of the multiple different lookup tables. In some embodiments, a given partition of the multiple different partitions includes an ordered list of objects, and the computing system maintains ordering from among the different partitions according to an ordered list of partitions.

At 560, the computing system provides requested data according to a lazy loading technique, including providing requested data (e.g., requested data 155) via the endpoint based on the metadata in the key/value store.

Figure 6:
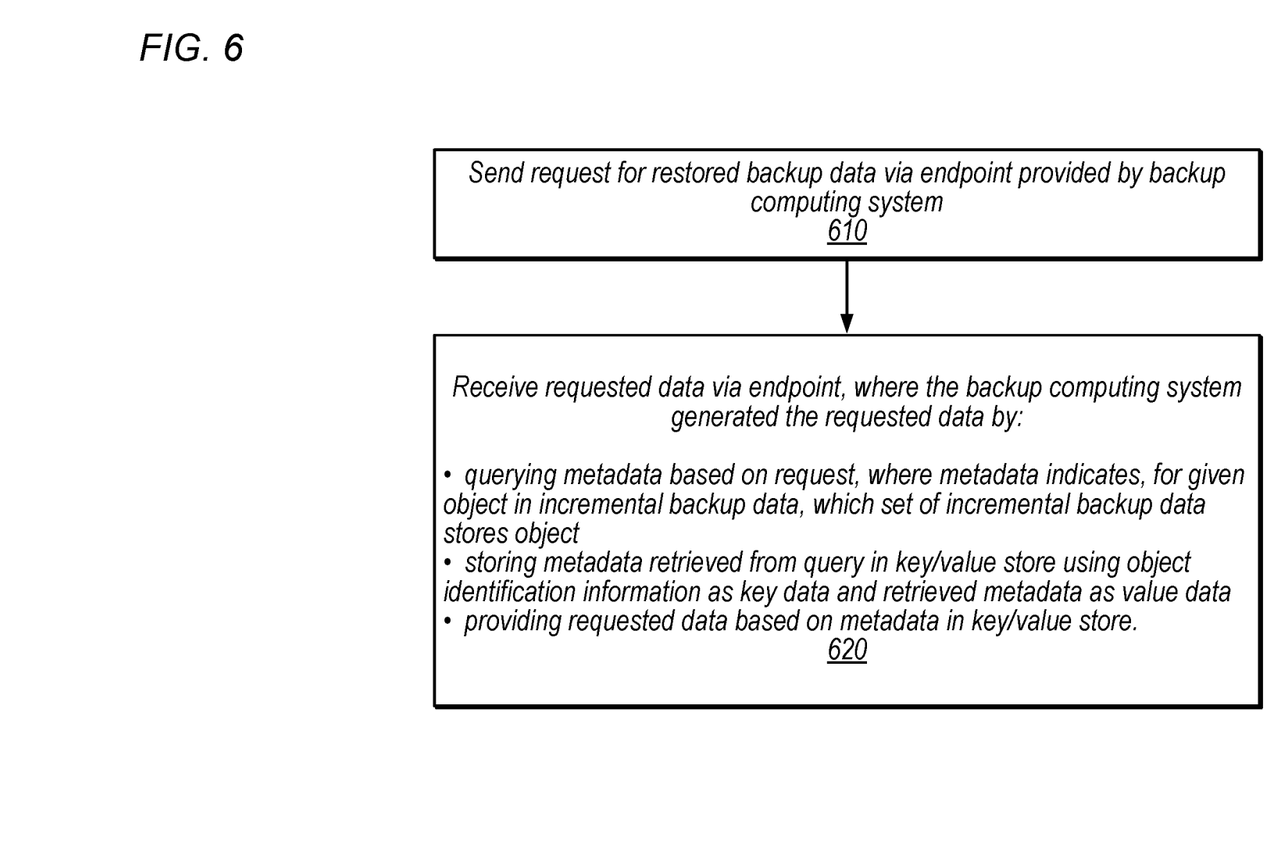
FIG. 6 is a flow diagram illustrating an example method for accessing backup data by a requesting computer system, according to some embodiments.

FIG. 6 is a flow diagram illustrating an example method for implementing a quick access service that allows a requesting computing system to access backup data stored by a second computing system, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, a requesting computing system (e.g., customer account 110) sends a request (e.g., request 115) for restored backup data (e.g., from data bucket(s) 170A) via an endpoint (e.g., endpoint 150) provided by a backup computing system (e.g., Clumio account 120). In various embodiments, the requesting computing system receives a full restore of requested data (e.g., rehydrate 175) to a data store (e.g., data bucket(s) 170B) of an account associated with the request, at least partially in parallel with receiving requested data (e.g., requested data 155) via the endpoint. In various embodiments, the requesting computing system requests the endpoint. The request for the endpoint may identify a protection group (e.g., in query parameters) and restoration time information (e.g., backup point 430).

At 620, the requesting computing system receives requested data via the endpoint. In various embodiments, the requested data has the following characteristics. For example, the backup computing system may have generated the requested data by querying metadata based on the request, where the metadata indicates, for a given object in incremental backup data, which set of incremental backup data stores the object. The backup computing system may have stored metadata retrieved from the query in a key/value store (e.g., key/value store 140) using object identification information (e.g., prefix/object name 212) as key data and the retrieved metadata as value data. The backup computing system may have provided the requested data based on the metadata in the key/value store. In some embodiments, the backup computing system performs the querying, storing, and providing as part of the method. Note that in some embodiments (e.g., cloud embodiment) the requesting computing system and the backup computing system may be the same system or portions thereof.

Example Computer System

Figure 7:
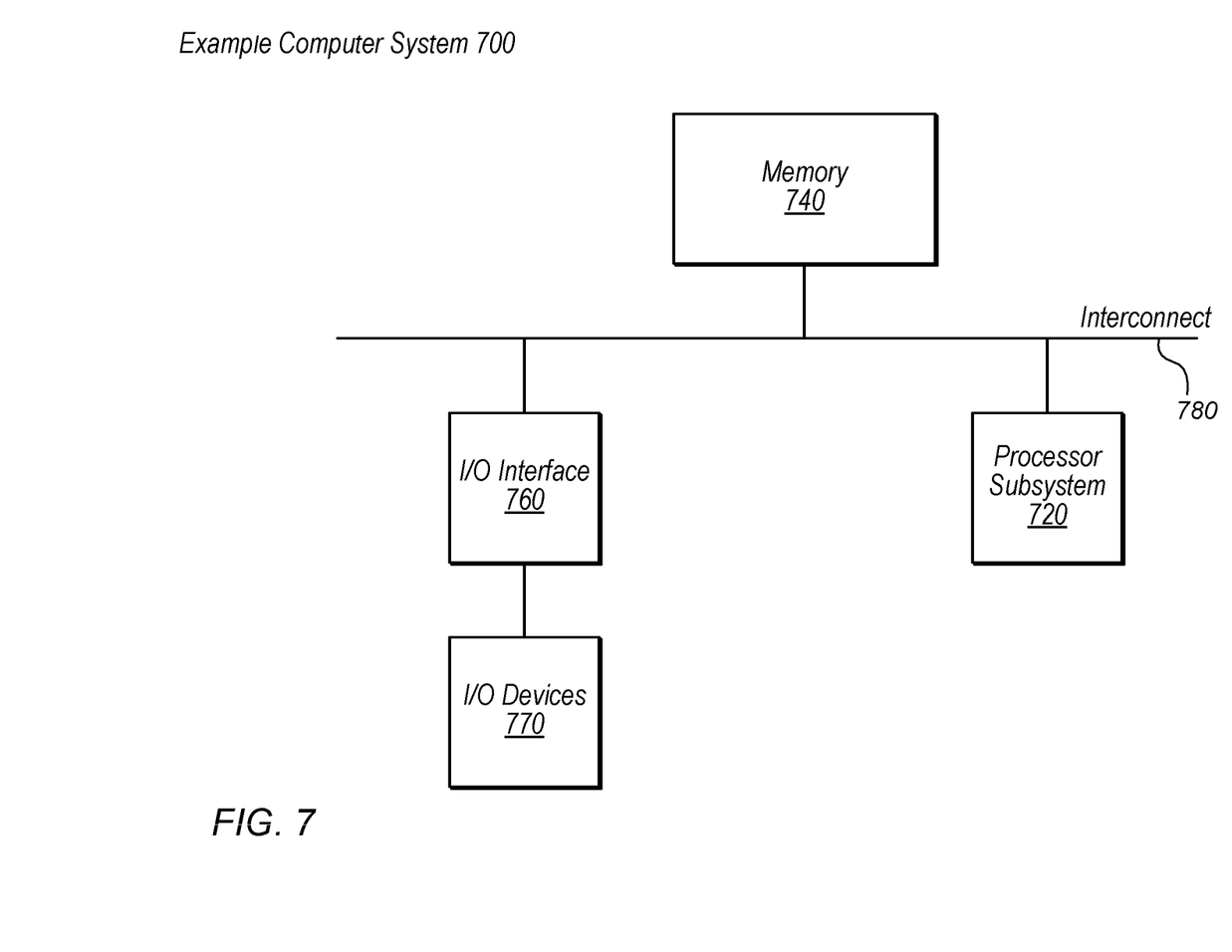
FIG. 7 is a block diagram illustrating an example computing device, according to some embodiments.

Referring now to FIG. 7, a block diagram of an example computer system 700 is depicted, which may implement one or more computer systems, such as one or more cloud-based server computer systems used to implement the worker function and endpoint of FIG. 1, the key/value store of FIG. 2, the partitions of FIG. 3, the request of FIG. 4, and other disclosed techniques, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 to perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over Wifi, Bluetooth, Ethernet, etc.), and computer system 700 is coupled to a network via the network interface device.

As used herein, a "module" refers to software or hardware that is operable to perform a specified set of operations. A module may refer to a set of software instructions that are executable by a computer system to perform the set of operations. A module may also refer to hardware that is configured to perform the set of operations.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

The invention claimed is:

1. A method, comprising:
   storing, by a computing system:
   multiple sets of incremental backup data that reflects changes in data being backed up between backup intervals, and
   metadata that indicates, for a given object, which set of incremental backup data stores the given object;
   generating, by the computing system, an endpoint for a requesting computing system, wherein the endpoint supports requests for restored backup data and data responses; and
   in response to a request from the requesting computing system via the endpoint, by the computing system:
   querying the metadata based on the request,
   storing metadata retrieved from the querying in a key/value store using object identification information as key data and the retrieved metadata as value data,
   providing requested data according to a lazy loading technique, including providing requested data via the endpoint based on the metadata in the key/value store; and
   performing a full restore of the requested data to a data store of an account associated with the request, wherein the full restore is performed at least partially in parallel with the lazy loading technique.

2. The method of claim 1, wherein the object identification information includes an object name, a prefix, or both.

3. The method of claim 1, wherein the metadata includes object location information, an object creation time, and a size of the given object.

4. The method of claim 1, wherein the storing includes storing retrieved metadata in multiple different lookup tables of the key/value store.

5. The method of claim 4, wherein the querying the metadata includes performing multiple queries at least partially in parallel to multiple different partitions of the multiple sets of incremental backup data.

6. The method of claim 5, wherein the querying the metadata and the storing are based on a mapping of multiple partitions to a given lookup table of the multiple different lookup tables.

7. The method of claim 5, wherein:
   a given partition of the multiple partitions includes an ordered list of objects; and
   the storing maintains ordering from among the multiple partitions according to an ordered list of partitions.

8. The method of claim 1, wherein the request specifies at least one protection group.

9. The method of claim 1, wherein the request specifies restoration time information.

10. The method of claim 1, wherein the generating the endpoint is performed in response to an endpoint request from the requesting computing system.

11. A non-transitory computer-readable medium having instructions stored thereon that are executable by a computing device to perform operations comprising:
    storing:
    multiple sets of incremental backup data that reflects changes in data being backed up between backup intervals, and
    metadata that indicates, for a given object, which set of incremental backup data stores the given object;
    generating an endpoint for a requesting computing system, wherein the endpoint supports requests for restored backup data and data responses; and
    in response to a request from the requesting computing system via the endpoint:
    querying the metadata based on the request, wherein the querying includes performing multiple queries at least partially in parallel to multiple different partitions of the multiple sets of incremental backup data,
    storing metadata retrieved from the querying in a key/value store using object identification information as key data and the retrieved metadata as value data, wherein the storing includes storing retrieved metadata in multiple different lookup tables of the key/value store, and
    providing requested data according to a lazy loading technique, including providing requested data via the endpoint based on the metadata in the key/value store.

12. The non-transitory computer-readable medium of claim 11, wherein the querying the metadata and the storing are based on a mapping of partitions to a given lookup table of the multiple different lookup tables.

13. A method, comprising:
    sending, by a requesting computing system, a request for restored backup data via an endpoint provided by a backup computing system; and
    receiving requested data via the endpoint, wherein the backup computing system generated the requested data by:
    querying metadata based on the request, wherein the metadata indicates, for a given object in incremental backup data, which set of incremental backup data stores the given object,;
    storing metadata retrieved from the querying in a key/value store using object identification information as key data and the metadata as value data; and
    providing the requested data based on the metadata in the key/value store; and
    receiving a full restore of the requested data at a data store of an account associated with the request, at least partially in parallel with receiving requested data via the endpoint.

14. The method of claim 13, further comprising, the backup computing system performing the querying, the storing, and the providing.

15. The method of claim 13, further comprising:
   requesting, by the requesting computing system, the endpoint.

16. The method of claim 15, wherein the request for the endpoint identifies a protection group and restoration time information.

* * * * *